(12) United States Patent
Togo et al.

(10) Patent No.: US 6,257,547 B1
(45) Date of Patent: Jul. 10, 2001

(54) MOLD ASSEMBLY FOR FORMING OPHTHALMIC LENS

(75) Inventors: Motonobu Togo, Inuyama; Kenichi Ishihara, Kasugai, both of (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 09/323,314

(22) Filed: Jun. 1, 1999

(30) Foreign Application Priority Data

Jun. 3, 1998 (JP) ................................................. 10-154107

(51) Int. Cl.$^7$ ....................................................... B29D 11/00
(52) U.S. Cl. ............................ 249/160; 249/117; 425/808
(58) Field of Search .................................. 249/117, 160; 425/412, 808; 264/1.1, 1.27

(56) References Cited

U.S. PATENT DOCUMENTS

| | | | |
|---|---|---|---|
| 4,209,289 | 6/1980 | Newcomb et al. | 425/410 |
| 4,211,384 | * 7/1980 | Bourset et al. | 249/160 |
| 5,238,388 | 8/1993 | Tsai | 425/412 |
| 5,252,056 | * 10/1993 | Horner et al. | 425/555 |
| 5,271,875 | * 12/1993 | Appleton et al. | 264/2.3 |
| 5,395,558 | 3/1995 | Tsai | 264/2.5 |

FOREIGN PATENT DOCUMENTS

| | | |
|---|---|---|
| 5-337957 | 12/1993 | (JP) . |
| 6-170858 | 6/1994 | (JP) . |

* cited by examiner

*Primary Examiner*—Tim Heitbrink
*Assistant Examiner*—Donald Heckenberg
(74) *Attorney, Agent, or Firm*—Burr & Brown

(57) ABSTRACT

Lens mold assembly including a first and a second mold cooperating with each other to define a mold cavity for molding an ophthalmic lens with the first and second molds being held in line contact with each other at a radial position, wherein at least one of the two molds consists of a central molding portion located radially inwardly of the radial position, and an outer rim portion located radially outwardly of the radial position, the central molding portion cooperating with the other mold to define the mold cavity, the above-indicated at least one mold having a mold surface which is opposed to a mold surface of the other mold when the two molds are assembled together, the mold surface of the at least one mold consisting of a central lens-forming region in the central molding portion, and an outer peripheral non lens-forming region in the outer rim portion, at least a part of the lens-forming region adjacent to the radial position providing a concave portion, while at least a part of the outer peripheral non lens-forming region adjacent to the radial position providing a convex portion.

8 Claims, 5 Drawing Sheets

OUTER RIM PORTION Y | CENTRAL MOLDING PORTION X | OUTER RIM PORTION Y

MOLD ASSEMBLY FOR FORMING OPHTHALMIC LENS

The present application is based on Japanese Patent Application No. 10-154107 filed Jun. 3, 1998, the content of which is incorporated hereinto by reference.

BACKGROUND OF THE INVENTION

FIELD OF THE ART

The present invention relates to a mold assembly for forming an ophthalmic lens such as a contact lens or an intraocular lens. More particularly, the invention is concerned with such a mold assembly which does not need a sharp annular protrusion or edge portion such as a knife-edge portion for defining an edge of the ophthalmic lens.

DISCUSSION OF THE RELATED ART

There have been proposed various techniques for producing an ophthalmic lens by a mold assembly consisting of a first mold and a second mold in the form of a male mold and a female mold or an upper mold and a lower mold, which are assembled together so as to define therebetween a mold cavity having a configuration that gives the intended ophthalmic lens such as a contact lens or an intraocular lens. The mold cavity defined upon closing or assembling of the first and second molds is filled with a suitable lens material to mold the intended ophthalmic lens.

To define the mold cavity between the two molds, the two molds are assembled together such that they are held in close contact with each other at their radially outer peripheral portions functioning as abutting contact portions, so that the ophthalmic lens to be obtained in the mold cavity has an intended edge profile defined by the abutting contact portions of the two molds which are held in close contact with each other, and so that the mold cavity defined between the two molds is fluid-tightly sealed so as to prevent leakage of the lens material therefrom during a molding operation for forming the ophthalmic lens. In general, the abutting contact portions of the two molds make close line contact or surface contact with each other to define the fluid-tight mold cavity. When the two molds are constructed for the line contact, the abutting contact portion of one of the two molds is in the form of a sharp annular protrusion such as a knife edge that is brought into line contact with the abutting contact portion of the other mold. When the two molds are constructed for the surface contact, the two molds have respective flat mating surfaces which are brought into abutting surface contact with each other for defining the mold cavity.

U.S. Pat. Nos. 5,238,388 and 5,395,558 disclose one example of the mold assembly constructed for the line contact. In this mold assembly consisting of a male and a female mold, at least one of the two molds has a knife-edge portion which is held in line contact with the other mold. In a molding operation using the thus formed mold assembly, the knife-edge portion of the above-indicated one mold is held in abutting contact with the corresponding portion of the other mold to define a fluid-tightly sealed mold cavity between the two molds while the two molds are forced together, so that a lens material filling the mold cavity is polymerized to produce an intended ophthalmic lens. The mold assembly disclosed in the U.S. Patent, however, suffers from various problems. For instance, it requires a high level of worker's skill to form the mold assembly with such a knife-edge portion, resulting in a low non-defective ratio of the mold assembly when the mold assembly is produced by a molding operation as generally employed in the art. Further, if the knife-edge portion is not formed with high accuracy of configuration, the ophthalmic lens to be obtained does not have an intended edge profile.

U.S. Pat. No. 4,209,289 discloses one example of the mold assembly constructed for the surface contact. In this mold assembly consisting of a male and a female mold, the male mold has a flat mating surface extending radially outwardly of the periphery of its convex molding surface, while the female mold has a flat mating surface extending radially outwardly of the periphery of its concave molding surface. When the male and female molds are assembled together, the flat mating surfaces of the two molds are held in abutting contact with each other to define a fluid-tightly sealed mold cavity between the two molds. In the thus formed mold assembly, if the mating surfaces of the two molds are not accurately aligned or engaged with each other, the configuration of the mold cavity may undesirably have a deviation with respect to the nominal design. In this case, the configuration of the ophthalmic lens to be formed in the mold cavity may have a corresponding deviation. In particular, the obtained ophthalmic lens does not have an intended edge profile due to the misalignment of the mating surfaces of the two molds.

JP-A-5-337957 and JP-A-6-170858 disclose another example of the mold assembly constructed for the surface contact. The disclosed mold assembly consists of two identically constructed molds. Each of the two molds has a concave and a convex mold surface, and two flat contacting surfaces formed radially outwardly of the convex and concave mold surfaces, respectively. When the two molds are assembled together, their contacting surfaces are brought into abutting contact with each other, so as to define a fluid-tightly sealed mold cavity between the two molds. The thus constructed mold assembly requires a relatively large clamping force for holding the two molds together such that the contacting surfaces are kept in abutting contact with each other during a molding operation for forming an intended contact lens. The clamping force applied to the molds, however, may cause deformation of the molds, undesirably resulting in a change in the spherical degree of the ophthalmic lens to be obtained and a change in the volume of the mold cavity. Further, for establishing close abutting contact between the contacting surfaces of the two molds, the contacting surfaces need to be have high accuracy of straightness.

SUMMARY OF THE INVENTION

It is therefore an object of the present invention to provide a mold assembly which permits easy production of an intended ophthalmic lens having a desired edge profile, and which does not have a sharp protrusion such as a knife edge, or which does not require a large force for keeping the molds in a closed state to define a fluid-tightly sealed mold cavity.

The above-described object of the present invention may be attained according to a principle of the present invention, which provides a mold assembly for forming an ophthalmic lens, the mold assembly comprising a first mold and a second mold which cooperate with each other to define therebetween a mold cavity having a profile following that of the ophthalmic lens with the first and second molds being held in line contact with each other at a predetermined radial position, wherein the improvement comprises: at least one of the first and second molds consisting of a central molding portion located radially inwardly of the radial position, and an outer rim portion located radially outwardly of the radial position, the central molding portion of the at least one mold cooperating with the other mold to define therebetween the mold cavity when the two molds are assembled together; and the at least one mold having a mold surface which is opposed to a mold surface of the other mold when the two molds are assembled together, the mold surface of the at least one mold consisting of a central lens-forming region in the central molding portion, and an outer peripheral non lens-forming region in the outer rim portion, at least a part of the lens-forming region which is adjacent to the radial position providing a concave portion, while at least a part of the outer peripheral non lens-forming region which is adjacent to the radial position providing a convex portion.

In the present mold assembly wherein the first and second molds are held in line contact with each other at the radial position, and at least one of the first and second molds has the mold surface which consists of the central lens-forming region in the central molding portion, and the outer peripheral non lens-forming region in the outer rim portion, at least a part of the lens-forming region which is radially inwardly adjacent to the radial position is made concave to provide the concave portion, while at least a part of the outer peripheral non lens-forming region which is radially outwardly adjacent to the radial position is made convex to provide the convex portion. According to this arrangement, the first and second molds are held in line contact with each other without requiring the conventionally required sharp protrusion such as a knife-edge portion to define a fluid-tightly sealed mold cavity between the two molds. Accordingly, the edge profile of the mold cavity can be defined by the annular line contact of the two molds at the radial position. In addition, the present mold assembly establishes sufficiently effective sealing between the two molds without applying a large force therebetween, so that the ophthalmic lens to be formed in the mold cavity has a desired edge profile with high stability.

In one preferred form of the present invention, a tangent line which is tangent at the radial position to the convex portion of the outer rim portion of the at least one mold intersects a tangent line which is tangent at the radial position to the mold surface of the other mold, such that the tangent lines form therebetween an angle θ of 1°0 -9° the convex portion having a radius of curvature in a range of 0.06-1 mm at the radial position.

In another preferred form of the present invention, the first mold is a male mold while the second mold is a female mold. At least one of the male and female molds has a mold surface which consists of the central lens-forming region and the outer peripheral non lens-forming region. In the thus formed mold surface, at least a part of the lens-forming region which is adjacent to the radial position is concaved to provide the concave portion, while at least a part of the outer peripheral non lens-forming region which is adjacent to the radial position is convexed to provide the convex portion.

In still another preferred form of the present invention, the mold cavity is filled with a polymeric material that is polymerized into the ophthalmic lens.

In yet another preferred form of the present invention, the ophthalmic lens is a contact lens.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF THE PREFERRED EMBODIMENTS

Figure 1A:
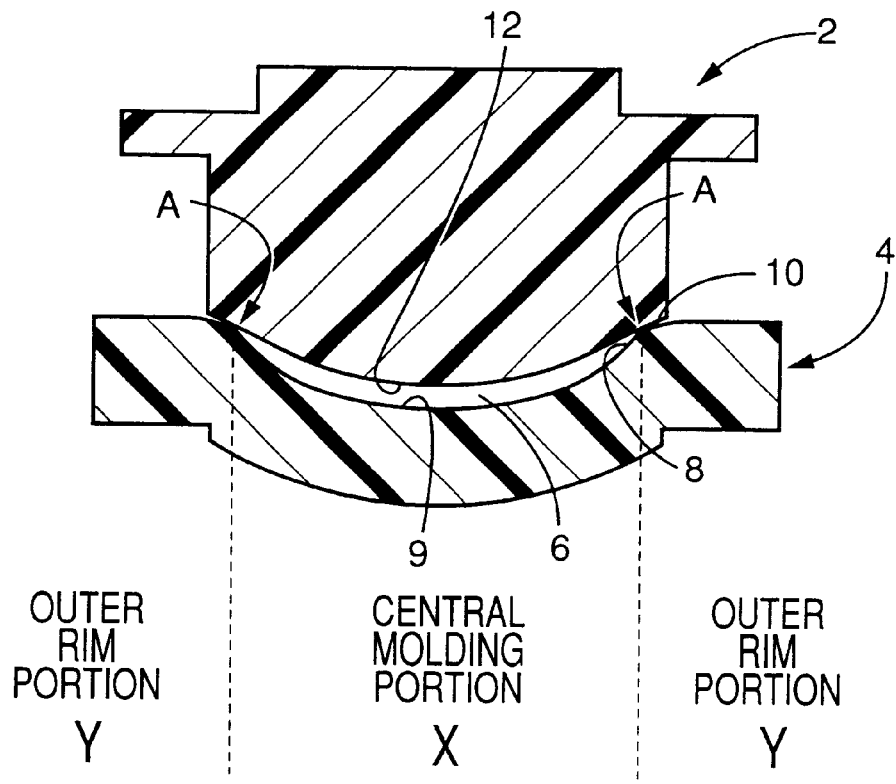
FIG. 1.(a) is an axial cross sectional view of a mold assembly consisting of a male mold and a female mold for forming an ophthalmic lens, which mold assembly is constructed according to one embodiment of the present invention, the view showing the mold assembly when the two molds are closed together such that they are held in contact with each other at a radial position A.
FIG. 1(b) is a fragmentary enlarged view of the mold assembly of FIG. 1(a) in axial cross section, the view showing a part of the mold assembly adjacent to the radial position A.
Figure 1B:
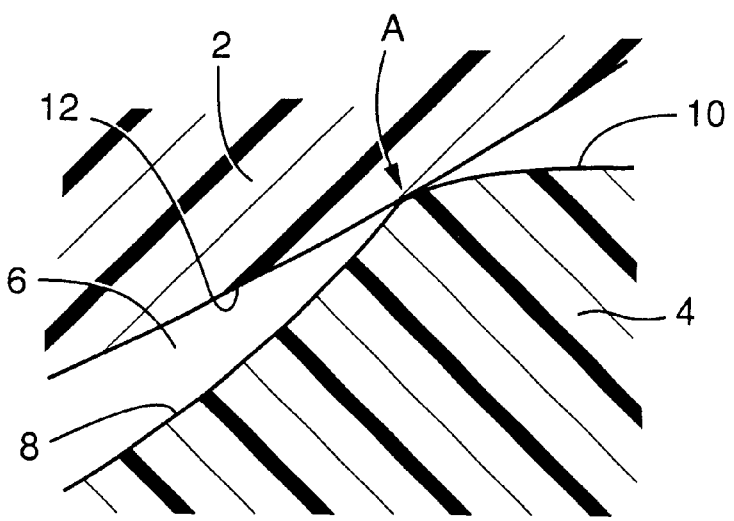

Referring first to FIGS. 1(a) and 1 (b), there is shown a mold assembly for forming an ophthalmic lens constructed according to one embodiment of the present invention. The mold assembly includes a male mold 2 and a female mold 4. As shown in FIG. 1(a), the male and female molds 2, 4 are assembled together to define therebetween a mold cavity 6 whose profile follows that of an intended ophthalmic lens, e.g., a contact lens in this embodiment.

The male mold 2 and the female mold 4 are assembled together such that they are held in line contact with each other at a radial position A, to thereby define therebetween the fluid-tight mold cavity 6. In the present embodiment, the female mold 4 includes a central molding portion X which is located radially inwardly of the radial position A, and an outer rim portion Y which is located radially outwardly of the radial position A. The female mold 4 has an upper mold surface consisting of a central lens-forming region 9 in the central molding portion X, and an outer peripheral non lens-forming region in the outer rim portion Y. In the female mold 4 formed as described above, at least a part of the central lens-forming region 9, which is adjacent to the radial position A, is made concave to provide a concave portion 8, while at least a part of the non lens-forming region, which is adjacent to the radial position A, is made convex to provide a convex portion 10. The male mold 2 has a convexedly curved mold surface 12 which cooperates with the lens-forming region 9 of the mold surface of the female mold 4 to define therebetween the mold cavity 6 for forming the intended ophthalmic lens. The thus formed male and female molds 2, 4 are assembled together such that the female mold 4 is held in contact with the convex mold surface 12 of the male mold 2 at a boundary between the the concave portion 8 of the lens-forming region 9 and the convex portion 10 of the non lens-forming region, whereby the two molds 2, 4 are held in line contact with each other at the radial position A.

Figure 2:
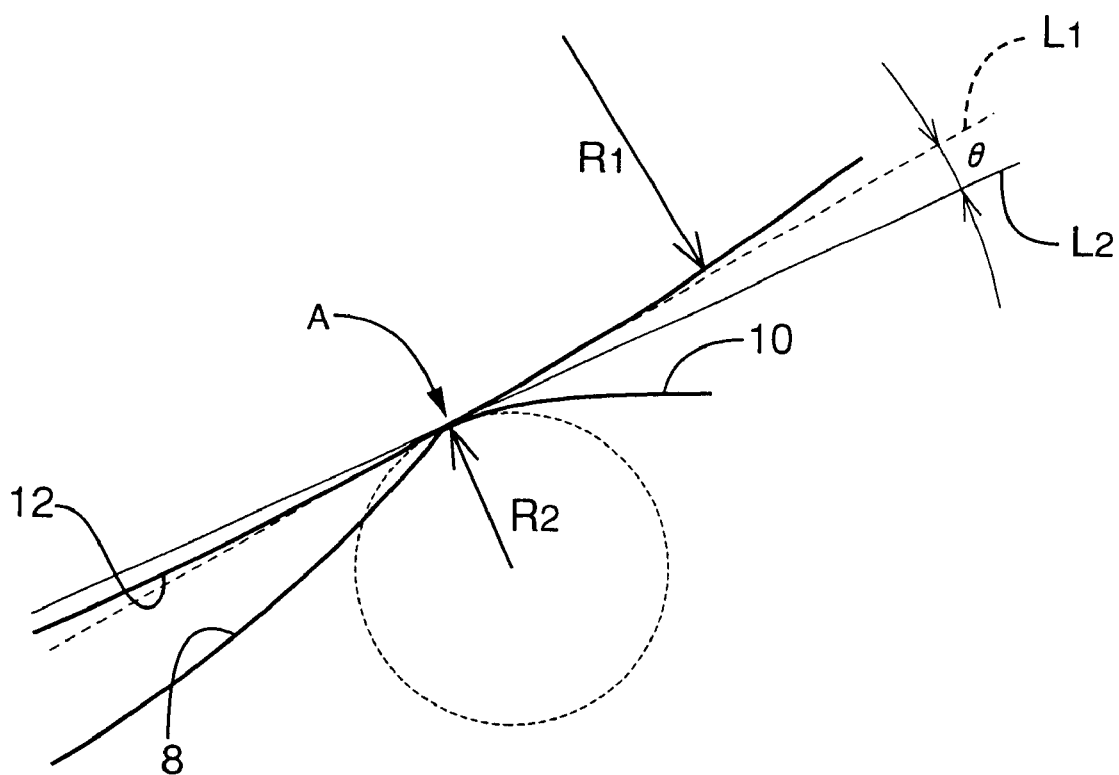
FIG. 2 is a view schematically indicating the line contact of the two molds at the radial position A.

As shown in FIG. 2 which schematically indicates the line contact of the male and female molds 2, 4 at the radial position A, as seen in axial cross section of the two molds 2, 4, the mold surface 12 of the male mold 2 is a convexedly curved surface having a radius of curvature $R_1$ at the radial position A, while the mold surface of the female mold 4 includes the concave portion 8 formed in at least a part of the lens-forming region 9 radially inwardly adjacent to the radial position A, and the convex portion 10 formed in at least a part of the non lens-forming region radially outwardly adjacent to the radial position A. The concave portion 8 is shaped to have a profile which gives at least an edge portion of the intended ophthalmic lens, while the convex portion 10 is shaped to have a radius of curvature $R_2$ at the radial position A, which is considerably smaller than the radius of curvature $R_1$. In the present embodiment, a tangent line $L_1$ which is tangent at the radial position A to the convexedly curved mold surface 12 having the radius of curvature $R_1$ intersects a tangent line $L_2$ which is tangent at the radial position A to the convex portion 10 having the radius of curvature $R_2$, such that the two tangent lines $L_1$ and $L_2$ form a suitable angle θ therebetween.

In the present mold assembly consisting of the male and female molds 2, 4 constructed as described above, the two molds 2, 4 are assembled together such that the female mold 4 is held in abutting line contact with the male mold 2 at an annular protuberance constituted by the connected end portions of the concave portion 8 and the convex portion 10, whereby the fluid-tightly sealed mold cavity 6 is formed radially inwardly of the radial position A. The mold cavity 6 has a profile following that of the intended ophthalmic lens. Accordingly, the mold assembly of the present invention does not need the conventionally required sharp protrusion such as a knife edge for making line contact between the two molds 2, 4 of the mold assembly, thereby facilitating production of the male and female molds, 2, 4 by molding and increasing the non-defective ratio of the produced mold assemblies. Further, the annular protuberance of the female mold 4 which is given by the connected end portions of the concave portion 8 and the convex portion 10 and which is held in abutting line contact with the convexedly curved mold surface 12 of the male mold 2 can be easily formed with high accuracy of configuration, so that the ophthalmic lens to be formed in the mold cavity 6 has a desired edge profile.

In the present mold assembly, the female mold 4 is held in abutting contact with the male mold 2 at its annular protuberance given by the connected end portions of the concave portion 8 and the convex portion 10, so that the two molds 2, 4 are held in line contact with each other at the radial position A to define therebetween the fluid-tightly sealed mold cavity 6. This arrangement does not require a large clamping force as required in the conventional mold assembly constructed for the surface contact to hold the molds together with the contacting or mating surfaces of the two molds being aligned with each other. Accordingly, the present mold assembly is free of the problem of deformation of the molds which would be otherwise caused by the large clamping force applied to the molds, to thereby avoid changes of the volume of the mold cavity and the spherical degree of the ophthalmic lens to be obtained. Unlike the conventional mold assembly constructed for the surface contact of the male and female molds wherein the edge portion of the obtained ophthalmic lens may suffer from deformation due to misalignment of the contacting or mating surfaces upon closing of the two molds, the present mold assembly is capable of forming the ophthalmic lens having a desired edge profile. Moreover, in the present mold assembly, there is no need to form flat contacting or mating surfaces which make close surface contact with each other, as required in the conventional mold assembly constructed for the surface contact. Accordingly, the present invention permits considerably easy manufacture of the male and female molds 2, 4 of the mold assembly.

In the present mold assembly consisting of the male and female molds 2, 4 constructed as described above, the configuration of the convexedly curved mold surface 12 of the male mold 2 having the radius of curvature $R_1$ at the radial position A, and the configuration of the concave portion 8 formed in at least a part of the lens-forming region 9 which is radially inwardly adjacent to the radial position A, are suitably determined depending upon the desired edge profile of the intended ophthalmic lens to be formed in the mold cavity 6. The configuration of the convex portion 10 formed in at least a part of the non lens-forming region which is radially outwardly adjacent to the radial position A, in other words, the radius of curvature $R_2$ of the convex portion 10 at the radial position A, and the angle θ formed by the tangent line $L_1$ which is tangent to the mold surface 12 of the male mold 4 at the radial position A and the tangent line $L_2$ which is tangent to the convex portion 10 at the radial position A, are suitably determined depending upon the desired edge profile of the intended ophthalmic lens to be formed in the mold cavity 6. A study made by the inventors of the present invention has revealed that the radius of curvature $R_2$ of the convex portion 10 at the radial position A is preferably in a range of 0.06 mm–1 mm, more preferably 0.08 mm–0.5 mm, while the angle θ formed by the two tangent lines $L_1$, $L_2$ is preferably in a range of 1°-9°, more preferably in a range of 3°-7°.

The male and female molds 2, 4 of the present mold assembly are formed of any known suitable materials such as resin, metal, and glass. For permitting easy manufacture of the molds having the intended structures by a known method employed in producing ordinary resin articles, such as molding, the male and female molds 2, 4 are preferably formed of a thermoplastic resin material such as polyolefins, for instance, polyethylene and polypropylene, or synthetic resin materials such as polystyrene, polycarbonate, polymethyl methacrylate, copolymer of ethylene and vinyl alcohol, polyacetal, polyamide, polyester and polysulfone. In particular, the male and female molds 2, 4 are formed to have the intended resin structures by using polyolefins such as polypropylene.

Figure 3A:
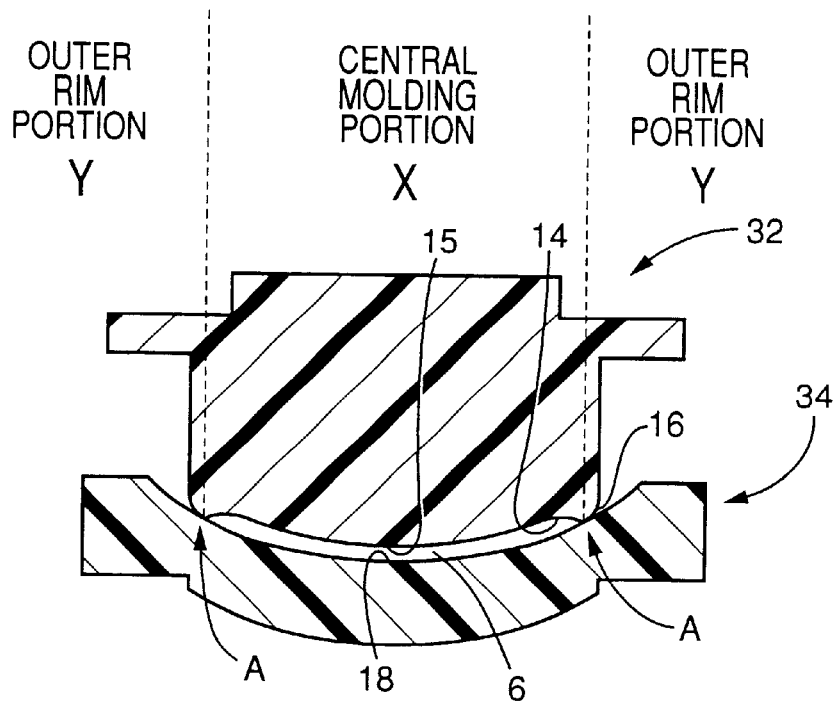
FIG. 3(a) is an axial cross sectional view corresponding to that of FIG. 1(a), showing a mold assembly constructed according to another embodiment of the invention.
Figure 3B:
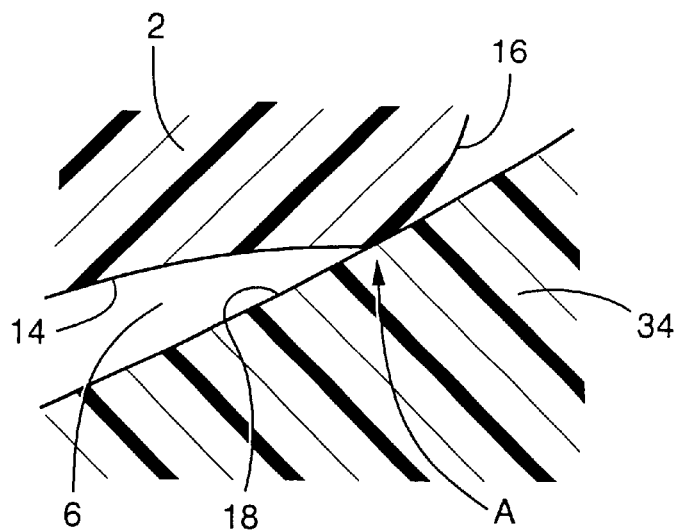
FIG. 3(b) is a fragmentary enlarged view of the mold assembly of FIG. 3(a) in axial cross section, the view showing a part of the mold assembly adjacent to the radial position A.

While the female mold 4 has the annular protuberance given by the connected end portions of the concave portion 8 and the convex portion 10 in the preceding embodiment, the male mold may have such an annular protuberance as shown in FIGS. 3(a) and 3 (b).

Described in detail referring to FIGS. 3(a) and 3 (b), there is shown a mold assembly constructed according to another embodiment of the present invention. The mold assembly in this embodiment includes a male mold 32 and a female mold 34, which are assembled together such that they are held in line contact with each other at a radial position A. In the present embodiment, the male mold 32 includes a central molding portion X located radially inwardly of the radial position A, and an outer rim portion Y located radially outwardly of the radial position A. The male mold 32 has a mold surface consisting of a central lens-forming region 15 in the central molding portion X, and an outer peripheral non lens-forming region in the outer rim portion Y. In the thus formed male mold 32, the central lens-forming region 15 includes a concave portion 14 formed in at least a part thereof adjacent to the radial position A, while the outer peripheral non lens-forming region has a convex portion 16 formed in at least a part thereof adjacent to the radial position A. The female mold 34 has a concave mold surface 18 which cooperates with the lens-forming region 15 of the male mold 32 to define therebetween the mold cavity 6 for forming the intended ophthalmic lens. The thus formed male and female molds 32, 34 are assembled together such that the male mold 32 is held in line contact with the mold surface 18 of the female mold 34 at an annular protuberance given by the connected end portions of the concave portion 14 of the lens-forming region 15 and the convex portion 16 of the non lens-forming region. Thus, the two molds 32, 34 are held in line contact with each other at the radial position A.

Figure 4:
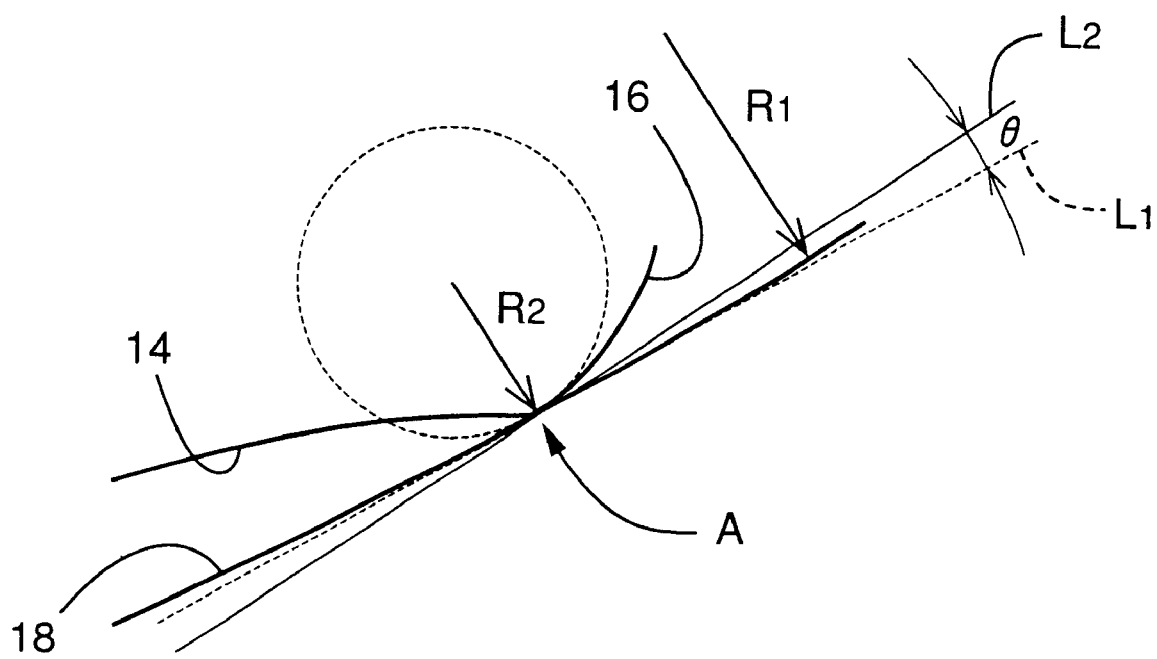
FIG. 4 is a view corresponding to that of FIG. 2, schematically indicating the line contact of the mold assembly.

As shown in FIG. 4, the mold surface 18 of the female mold 34 has a radius of curvature $R_1$ at the radial position A, while the convex portion 16 of the non lens-forming region of the male mold 32 has a radius of curvature $R_2$ at the radial position A. In the present mold assembly consisting of the male and female molds 32, 34 constructed as described above, a tangent line $L_1$ which is tangent to the concave mold surface 18 of the female mold 34 at the radial position A intersects a tangent line $L_2$ which is tangent to the convex portion 16 of the non lens-forming region of the male mold 32 at the radial position A, such that the two tangent lines $L_1$ and $L_2$ form a predetermined angle θ therebetween. In the thus formed mold assembly, the male and female molds 32, 34 are assembled together such that the male mold 32 is held in abutting line contact with the female mold 34 at its annular protuberance given by the connected end portions of the concave portion 14 and the convex portion 16, whereby the fluid-tightly sealed mold cavity 6 is formed radially inwardly of the radial position A.

Figure 5:
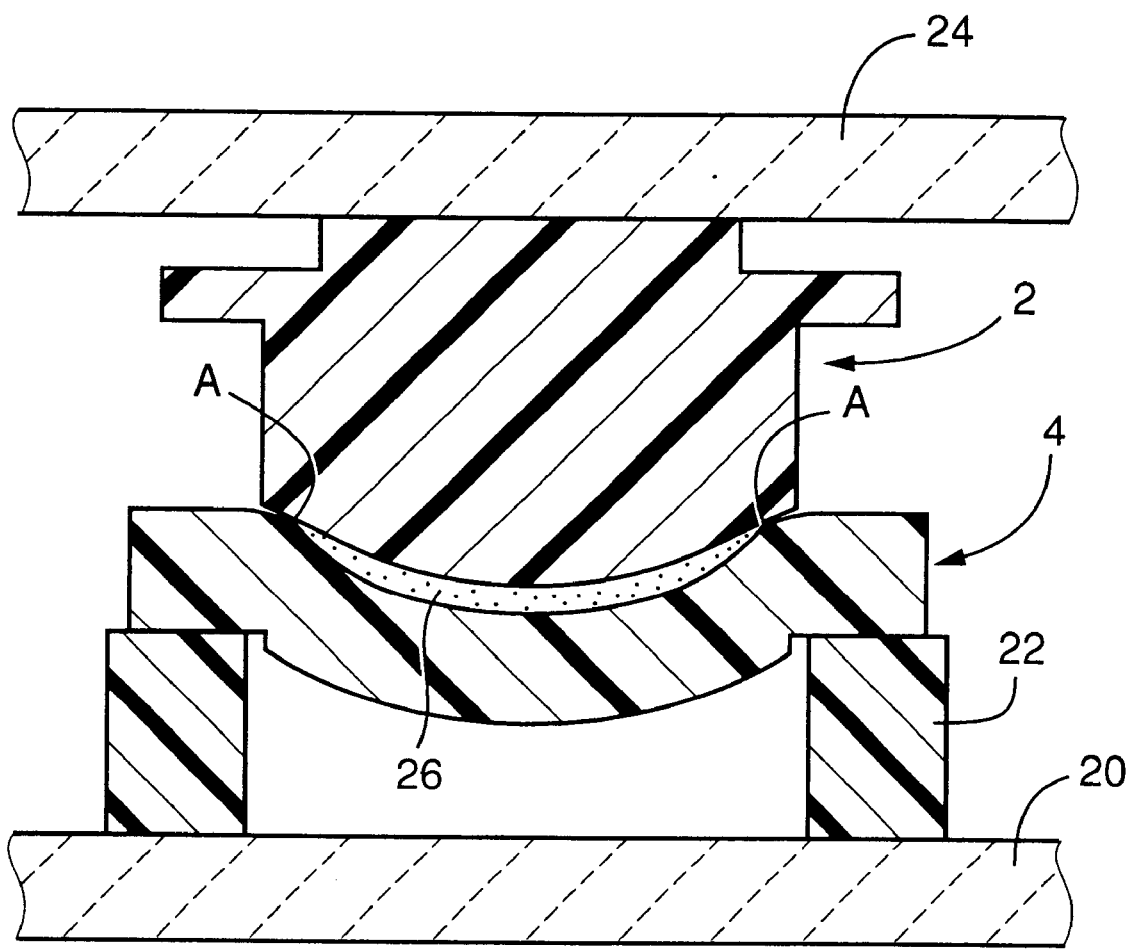
FIG. 5 is a view showing a molding operation for forming the ophthalmic lens, using the the mold assembly of FIGS. 1(a) and 1 (b), as seen in a plane which includes the center axes of the male and female molds.

Referring next to FIG. 5, there is shown a process of manufacturing an intended ophthalmic lens such as a contact lens or an intraocular lens, by using the present mold assembly consisting of the male and female molds 2, 4 prepared according to the first embodiment. Initially, a lens material 26 is introduced into a recess of the female mold 4, which recess is defined by the lens-forming region 9 of the mold surface of the female mold 4. Next, the male and female molds 2, 4 are assembled together so as to define the mold cavity 6 which is filled with the lens material 26. The thus assembled male and female molds 2, 4 are placed on a cylindrical resin support member 22 which is mounted on a rectangular glass plate 20, such that the mold assembly including the two molds 2, 4 is supported at the outer rim portion Y of the female mold 4, in the form of a flange, on the upper end face of the cylindrical resin support member 22. Subsequently, a transparent rectangular glass plate 24 is placed on the upper surface of the male mold 2 to apply a pressing force to the mold assembly. According to this arrangement, the male mold 2 is pressed against the female mold 4 with a suitable force based on the weight of the glass plate 24. As needed, a suitable weight is placed on the glass plate 24. In the present embodiment, four mold assemblies are arranged such that that they are sandwiched by and between the glass plates 20, 24 and located at the respective four corners of the two glass plates 20, 24. It is noted that only one of the four mold assemblies is shown in FIG. 5. The thus arranged four mold assemblies are evenly subjected to a pressing or clamping force applied by the glass plate 24.

While the lens material 26 which fills the mold cavity 6 may be selected from among any materials known in the art such as a polymer and a monomer, it is preferable to use a polymeric material similar to that conventionally used, i.e., a monomer liquid which gives a polymer of the intended ophthalmic lens. The monomer liquid generally includes at least one conventionally used radically polymerizable compound. Alternatively, the monomer liquid may be composed of a macromer or a prepolymer. such a compound includes at least one of vinyl, allyl, acryl and methacryl groups in its molecule, and is conventionally used as a material for a hard contact lens, a soft contact lens or an intraocular lens. Examples of such a compound include: esters of (meth) acrylic acid such as alkyl(meth)acrylate, siloxanyl (meth) acrylate, fluoroalkyl (meth)acrylate, hydroxyalkyl (meth) acrylate, polyethyleneglycol (meth)acrylate and polyhydric alcohol (meth)acrylate; derivatives of styrene; and N-vinyllactam. The monomer liquid includes, as needed, a polyfunctional monomer as a cross-linking agent, such as ethyleneglycol di(meth)acrylate or diethyleneglycol di(meth)acrylate. The monomer liquid further includes, as additives, a polymerization initiator such as thermopolymerization initiator or photopolymerization initiator, and a photosensitizer.

The polymeric material (monomer liquid) 26 which fills the mold cavity 6 is polymerized according to a known thermopolymerization or photopolymerization method, for instance. When the polymeric material (26) is polymerized by the photopolymerization method, the polymeric material (26) needs to be exposed to a light such as a UV radiation, for instance. In view of this, at least one of the male and female molds of the mold assembly is formed of a light-transmitting material, preferably, a transparent material. In addition, at least one of the plates 20, 24 which sandwich the mold assembly therebetween during the molding operation are formed of a transparent material such as a glass. According to this arrangement, the lens material 26 in the mold cavity 6 is polymerized by exposure to the light transmitted through at least one of the male and female molds, and at least one of the plates 20, 24.

The lens material 26 in the mold cavity 6 is polymerized as described above with the male and female molds being assembled together as shown in FIG. 5, such that the two molds are held in contact with each other at the radial position A. The mold surface of at least one of the male and female molds, which mold surface is to be held in contact with the other mold at the radial position A, is constructed according to the principle of the present invention, so that the two molds are held in sealing contact with each other at the radial position A, to thereby effectively prevent the lens material 26 from leaking from the mold cavity 6 defined between the two molds. Accordingly, the contact lens to be formed in the mold cavity 6 has a desired edge profile without suffering from burrs, whereby the contact lens can be produced with an increased non-defective ratio.

While the present invention has been described in detail in its presently preferred embodiments, it is to be understood that the invention is not limited to the details of the illustrated embodiments, but may be otherwise embodied with various other changes, modifications and improvements, which may occur to those skilled in the art without departing from the scope of the invention defined in the attached claims.

For instance, the mold surfaces of the male and female molds, each of which partially defines the mold cavity, are suitably shaped depending upon the configurations of the ophthalmic lens to be obtained. While, in the illustrated embodiments, the mold surface of at least one mold has two different radii of curvature at the central lens forming region and the outer peripheral non lens-forming region, the mold surface may have three or more different radii of curvature at three or more different regions thereof. Further, the mold surface may be an ellipsoidal surface, or a curved surface having a single radius of curvature. In producing a convex ophthalmic lens, two mold halves respectively having concave mold surfaces are assembled together to form a mold assembly of the present invention.

To further clarify the concept of the present invention, one example of the invention will be described. It is to be understood that the present invention is not limited to the details of the illustrated example.

EXAMPLE

The mold assembly consisting of the male mold 2 and the female mold 4 shown in FIGS. 1 and 2 were formed of polypropylene in a known molding process. Described in detail, the male and female molds 2, 4 were configured such that the contact lens to be obtained has a diameter of 13.5 mm, and a rear optical surface having a radius of curvature of 7 mm and a front optical surface having a radius of curvature of 8 mm. The rear optical surface is given by the mold surface 12 of the male mold 2, and the front optical surface is given by the lens-forming region 9 including the concave portion 8 of the female mold 4. Further, the radius of curvature $R_2$ of the convex portion 10 of the female mold 4 at the radial position A was 0.2 mm, while the angle $\theta$ formed by the tangent lines $L_1$ and $L_2$ was 5°.

In the meantime, a liquid composition for a contact lens was prepared as the polymeric lens material 26, which composition included 100 parts by weight of 2-hydroxyethyl methacrylate, 0.2 part by weight of a photopolymerization initiator, and 0.2 part by weight of ethyleneglycol dimethacrylate as a cross-linking agent.

Next, the thus prepared liquid composition was introduced in a recess defined by the lens-forming region 9 of the mold surface of the female mold 4. With the recess of the female mold 4 being filled with the liquid composition, the male mold 2 was assembled with the female mold 4. The mold assembly wherein the male and female molds 2, 4 are assembled together with the mold cavity 6 being defined therebetween and filled with the liquid composition was subjected to a molding operation to form the intended contact lens according to the manner shown in FIG. 5, with a clamping force of 0.5N applied between the molds 2, 4 by applying a UV radiation to the mold assembly through the glass plate for one hour, whereby the lens material 26 was photopolymerized. The UV radiation has a principal wavelength of 360 mm and an intensity of about 0.1 mW/cm$^2$.

Thereafter, the molded contact lens (polymerized product) was first removed from the mold assembly (2, 4) by impregnation with a distilled water, and was then subjected to a hydration treatment, so that the intended contact lens was obtained. A plurality of the contact lenses were obtained in the above manner, and it was confirmed that the obtained contact lenses were free of burrs at the outer peripheral portions thereof, and that the contact lenses were produced with the non-defective ratio of 90%.

Various contact lenses were molded, using various combinations of the male and female molds 2, 4, which have different values of the angle $\theta$ formed by the tangent lines $L_1$ and $L_2$ as indicated in the following Table, and wherein the convex portions 10 of different female molds 4 have different values of the radius of curvature $R_2$ at the radial position A, as also indicated in the Table. The non-defective ratios of the contact lenses, in other words, the ratios of the contact lenses without burrs, were obtained. The results are also indicated in the Table.

TABLE 1

| configuration of the female mold 4 | | non-defective ratio of the contact lenses |
|---|---|---|
| $R_2$ (mm) | $\theta$ (°) | (%) |
| 0.04 | 5 | 50 |
| 0.2 | 3 | 90 |
| 0.2 | 5 | 90 |
| 0.3 | 0 | 50 |
| 0.3 | 3 | 90 |
| 0.3 | 5 | 90 |
| 0.3 | 11 | 50 |
| 1.5 | 5 | 50 |

As is apparent from the above description, the male and female molds of the present mold assembly are assembled together such that the two molds are held in line contact with each other without the conventionally required sharp protrusion such as a knife-edge portion. This arrangement permits easy formation of the two molds. In addition, the ophthalmic lens to be obtained by using the present mold assembly has a desired edge profile, so that the ophthalmic lens can be easily produced at a reduced cost. Since it is not necessary to apply a large force for holding the two molds together during the molding operation, the molds are less likely to be deformed in the molding operation. In the present arrangement, it is easy to adjust the clamping force to be applied to the mold assembly during the molding operation, thereby facilitating the molding operation to form the ophthalmic lens and preventing deformation of the molds to accordingly prevent a change of the volume of the mold cavity, to thereby effectively lower the reject ratio of the contact lenses to be produced.

What is claimed is:

1. A mold assembly for forming an ophthalmic lens, said mold assembly comprising a first mold and a second mold which cooperate with each other to define therebetween a mold cavity having a profile following that of said ophthalmic lens with said first and said second molds being held in line contact with each other at a predetermined radial position, wherein the improvement comprises:

at least one of said first and said second molds consisting of a central molding portion located radially inwardly of said radial position, and an outer rim portion located radially outwardly of said radial position, said central molding portion of said at least one mold cooperating with the other mold to define therebetween said mold cavity when the two molds are assembled together; and said at least one mold having a mold surface which is opposed to a mold surface of the other mold when the two molds are assembled together, said mold surface of said at least one mold consisting of a central lens-forming region in said central molding portion, and an outer peripheral non lens-forming region in said outer rim portion, at least a part of said lens-forming region which is adjacent to said radial position being concave to the mold surface of said at least one mold, while at least a part of said outer peripheral non lens-forming region which is adjacent to said radial position being convex to the mold surface of said at least one mold.

2. A mold assembly according to claim 1, wherein a tangent line which is tangent at said radial position to said convex portion of said outer rim portion of said at least one mold intersects a tangent line which is tangent at said radial position to said mold surface of the other mold, such that said tangent lines form therebetween an angle θ of 1°-9°, said convex portion having a radius of curvature in a range of 0.06-1 mm at said radial position.

3. A mold assembly according to claim 1, wherein said first mold is a male mold while said second mold is a female mold.

4. A mold assembly according to claim 3, wherein said female mold has said concave portion and said convex portion.

5. A mold assembly according to claim 3, wherein said male mold has said concave portion and said convex portion.

6. A mold assembly according to claim 1, wherein at least one of said first and second molds is formed of a light-transmitting material.

7. A mold assembly according to claim 1, wherein said mold cavity is filled with a polymeric material that is polymerized into said ophthalmic lens.

8. A mold assembly according claim 1, wherein said ophthalmic lens is a contact lens.

* * * * *